Oct. 11, 1960

P. J. PACKMAN ET AL

2,955,698

APPARATUS FOR REPOSITIONING ARTICLES LYING ON A CONVEYING SURFACE

Filed Aug. 5, 1958

INVENTORS
PERCIVAL JAMES PACKMAN and
PERCIVAL HENRY MORRISON

By Michael S. Striker
Attorney

Oct. 11, 1960

P. J. PACKMAN ET AL 2,955,698

APPARATUS FOR REPOSITIONING ARTICLES LYING ON A CONVEYING SURFACE

Filed Aug. 5, 1958

INVENTORS
PERCIVAL JAMES PACKMAN
and
PERCIVAL HENRY MORRISON
BY Michael S. Striker
Attorney

United States Patent Office 2,955,698
Patented Oct. 11, 1960

2,955,698

APPARATUS FOR REPOSITIONING ARTICLES LYING ON A CONVEYING SURFACE

Percival James Packman and Percival Henry Morrison, Twyford, England, assignors, by mesne assignments, to Baker Perkins Limited, Westwood Works, England, a British company Filed Aug. 5, 1958, Ser. No. 753,374

15 Claims. (Cl. 198—34)

The present invention relates to apparatus for automatically repositioning articles lying on a moving conveying surface. It relates in particular, but not exclusively, to apparatus for repositioning biscuits lying on a moving band conveyor.

In the handling of large numbers of articles employing a number of conveying surfaces, for example band conveyors, there is usually a tendency, over a period of time, for the articles to be displaced bodily in the transverse direction with respect to the direction of advance of the conveying surfaces. This bodily displacement of the articles, which usually is a gradual process caused by the transfer of the articles from one conveying surface to another conveying surface which wanders from side to side over a period of time in relation to the first conveying surface, makes subsequent handling of the articles more difficult. For example, in the case of feeding biscuits by means of a band conveyor to apparatus of the kind described in U.S.A. patent application Serial No. 524,370, dated July 28, 1955, the efficiency of the apparatus is reduced if the rows of biscuits approaching the apparatus do not occupy positions relative to the band conveyor which are substantially constant transversely of the direction of advance of the conveyor.

The object of the present invention is to provide apparatus for automatically repositioning articles, and in particular biscuits, lying on a moving conveying surface, so that the articles are arranged in a predetermined position on the same or another conveying surface.

According to the invention apparatus for automatically repositioning articles lying on a moving conveying surface in a number of rows extending in the general direction of advance of the conveying surface comprises guide means adapted to deflect the rows of articles transversely with respect to the direction of advance of the conveying surface, if necessary, to bring the rows into a predetermined position relative to the supporting framework of said conveying surface, and further means arranged in advance of said guide means for detecting transverse displacement in excess of a predetermined amount of one or more rows of the articles relative to the supporting framework of the same or another conveying surface and for adjusting the position of said guide means to receive the rows of articles.

The guide means may be arranged to deflect the articles on the same conveying surface as that with which the detecting means is associated. If desired, however, the guide means may be arranged to deflect the articles on a further conveying surface to which the articles are transferred after passing the detecting means.

The above mentioned detecting means preferably comprises one or more feelers pivotally supported adjacent to one edge of the conveying surface in the path of a row of the articles, which feeler is, or which feelers are, adapted to detect whether or not the row of articles is correctly positioned in the transverse direction with respect to the supporting framework of the conveyor.

The invention will now be described in greater detail with referencem to the accompanying drawing, in which.

Referring to Figures 1 to 4, the detecting means illustrated is intended for detecting the position of a row 1 of biscuits (shown only in Figures 1 and 3) on a band conveyor 2 moving in the direction of arrow A. The detecting means comprises a support 3 which is displaceable transversely of the band conveyor 2 on a plate 4 secured to the conveyor bed-plate 5. Displacement of the support 3 transversely of the band conveyor 2 is effected by a reversible D.C. electric motor 6 incorporating a reduction gear secured to the support 3. The motor 6 is adapted to rotate a lead screw 7 engaging a nut 8 mounted on a pillar 9 secured in the plate 4. The pillar 9 passes through a slot 10 in the support 3, the slot 10 and the lead screw 7 being disposed at right angles to the direction A.

Figure 1:
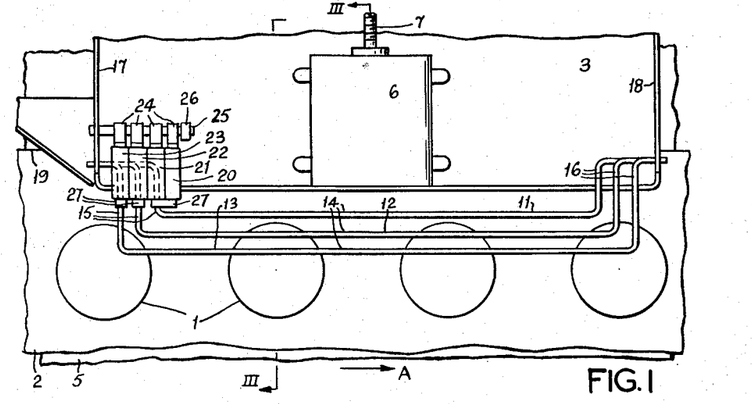
Figure 1 is a schematic plan for one form of detecting means forming part of apparatus according to the invention.
Figure 2:
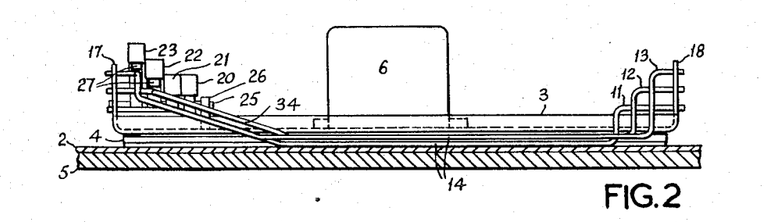
Figure 2 is a side elevation corresponding to Figure 1.
Figures 3, 4:
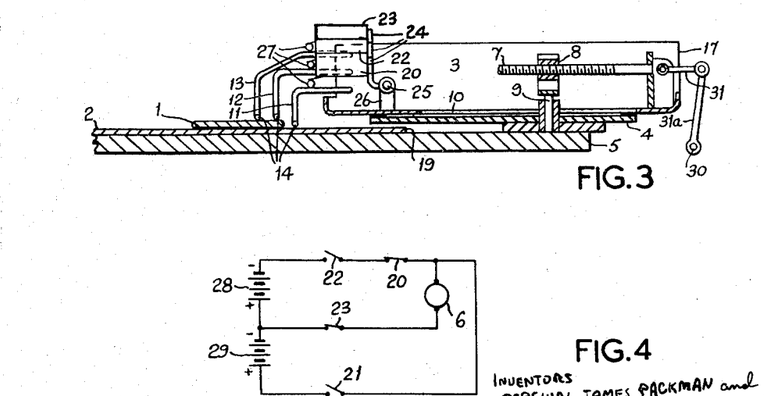
Figure 3 is a sectional view on the line III—III of Figure 1.
Figure 4 is an electric circuit diagram of the apparatus of Figures 1 to 3.

Three feelers 11, 12, 13 are pivotally mounted on the support 3. Each of these feelers consists of a light rod of circular cross-section having an intermediate portion 14 lying substantially at right angles to the two parallel end portions 15, 16 so that the feeler has the appearance, in plan, of a flattened U. The feelers are pivoted in the end walls 17, 18 of the support 3, the pivoting axes of the three feelers being parallel to the surface of the band conveyor 2 and lying in a vertical plane disposed parallel to the edge of the conveyor. The intermediate portions 14 of the three feelers overhang one edge 19 of the conveyor 2 and can rest on the upper surface of the latter.

The end portions 15, 16 of the three feelers have such a length that the intermediate portions 14 are disposed in substantially parallel spaced relationship parallel to the edges of the conveyor 2 (as best seen in Figure 1).

Four electric switches 20, 21, 22 and 23, preferably microswitches, are mounted by means of brackets 24 on a rod 25. The latter is supported at one end in the end wall 17 and at its other end in a bracket 26 secured to the support 3. The actuating members 27 of the three switches 21, 22, 23 are disposed directly above the end portions 15 of the feelers 11, 12 and 13, respectively, so that pivotal movement of the feelers causes actuation of these switches. Switch 20 is mounted at the side of switch 21 and the actuating members of these two switches are connected together so that when the contacts of switch 20 are closed the contacts of switch 21 are open, and vice versa.

When the row 1 of biscuits is correctly positioned in the transverse direction relative to the bed-plate 5 and when the feeler support 3 is in its central position in the transverse direction, then the biscuits of row 1 pass under feelers 12 and 13 and raise their intermediate portions whereas the intermediate portion of feeler 11 rests on the band conveyor 2 (as shown in Figure 3).

Feeler 13 is provided merely to cut off the supply of current to the electric motor 6 from a pair of batteries 28, 29 (Figure 4) and so prevent movement of the support 3, when there is an interruption in the flow of biscuits on the conveyor 2. To this end the switch 23 associated with feeler 13 is connected in the supply circuit of motor 6 and is arranged to be closed when the intermediate portion 14 of feeler 13 is raised by the biscuits. Switch 23 opens when (due to an interruption in the flow of biscuits) the intermediate portion 14 of feeler 13 drops down on to the surface of the conveyor 2.

Under the conditions assumed above regarding the position of the row of biscuits and the support 3, the contacts of the switches 21 and 22 associated with feelers 11 and 12 are open so that the electric motor 6 is disconnected from the batteries 28, 29.

If the row 1 of biscuits travelling under feelers 12 and 13 now moves closer to the conveyor band edge 19, or if the conveyor band itself wanders so that the edge 19 moves in the direction towards the pillar 9, the biscuits will pass under and raise the intermediate portion 14 of feeler 11. This has the effect of closing switch 21 and opening switch 20 to close a supply circuit to the motor 6 from battery 29. The motor then rotates to cause a displacement of the feeler support 3 transversely of the conveyor 2, the direction of rotation of the motor being such that the displacement of the support 3 is in the same direction as the transverse displacement of the row of biscuits that caused the raising of the intermediate portion 14 of the feeler 11. When the support 3 has been displaced a certain distance the intermediate portion 14 of feeler 11 passes off the displaced row of biscuits and drops back on to the surface of the conveyor 2 once more. The switch 21 associated with feeler 11 then opens again (and switch 20 closes) and the motor 6 ceases to rotate, so bringing the support 3 to rest. The contacts of the various switches are therefore restored to the positions shown in Figure 4.

If the row of biscuits now moves away from the edge 19 of the conveyor 2 the biscuits no longer pass under the intermediate portion 14 of feeler 12 with the result that the portion 14 of this feeler drops down onto the surface of the conveyor 2. This has the effect of closing the contacts of switch 22 to complete a supply circuit to the motor 6 from battery 28. The motor 6 now rotates in the opposite direction and moves the support 3 in the direction away from the edge 19. After a certain transverse movement of the support 3 the intermediate portion 14 of feeler 12 is moved back into the path of the row 1 of biscuits and is lifted from the surface of the conveyor once more by the biscuits. The contacts of switch 22 are then opened again and the electric motor 6 ceases to rotate to bring the support 3 to rest again.

The purpose of the switch 20 is to avoid short-circuiting of the batteries 28, 29 in the event that feelers 11 and 12 should be moved accidentally into positions in which both switches 21 and 22 are closed (i.e. with the intermediate portion 14 of feeler 11 raised and the intermediate portion 14 of feeler 12 lowered).

From the above description it will be appreciated that as the row 1 of biscuits wanders in the transverse direction relative to the bed-plate 5 the feeler support 3 is displaced in a substantially similar manner with a certain delay. These transverse movements of the feeler support 3 are converted into rotary motion of a shaft 30 by means of a mechanical linkage comprising a rod 31 and a link 31a. The rotary movements of shaft 30 are transmitted to the above mentioned guide means to move the latter into a position to receive the rows of biscuits on the conveyor 2. Various forms of such guide means will be described in detail hereinafter.

Adjusting means (not shown) are provided for each of the switches 21–23 by means of which the brackets 24 may be angularly adjusted on the rod 25 to adjust individually the position of the actuating member 27 of each of these switches in relation to the end portion 15 of its associated feeler.

Figure 5:
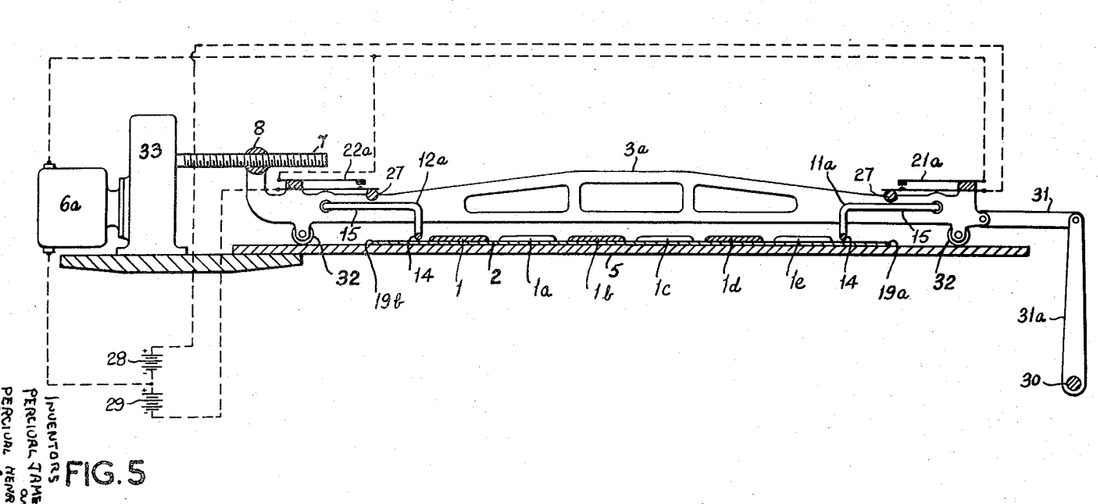
Figure 5 is an end elevation of a second form of detecting means.

Figure 5 shows a second form of detecting means which comprises two pivotally mounted feelers 11a and 12a similar to the feelers 11 and 12, respectively, of Figures 1 to 3. This detecting means comprises a feeler support 3a which extends right across the conveyor 2 and is supported at its ends on the bedplate 5 by rollers 32. The feeler support 3a is arranged to be displaced transversely with respect to the direction of advance of the conveyor 2 by a lead screw 7 driven by a reversible D.C. motor 6a through a reduction gear 33. The motor and gear box are secured to the bedplate 5 and the lead screw 7 engages a nut 8 on the feeler support 3a. Feeler 11a is pivotally mounted on the support 3a at one end thereof with its intermediate portion 14 overhanging the edge 19a of the conveyor 2. Feeler 12a is pivotally mounted at the other end of support 3a with its intermediate portion 14 overhanging the edge 19b of the conveyor. The end portions 15 of the feelers 11a and 12a are adapted to engage the actuating members 27 of electric switches 21a, 22a, respectively. The electrical connections of the switches 21a and 22a and the motor 6a to the batteries 28, 29 are shown in dotted lines.

When the rows 1, 1a, 1b . . . 1e of biscuits are correctly positioned relative to the bedplate 5 in the transverse direction of the conveyor and the feeler support 3a is in its central position in the transverse direction, then the intermediate portions 14 of the two feelers 11a and 12a rest on the surface of the conveyor. Under these conditions the switches 21a and 22a are open and the feeler support 3a is stationary. If now the rows of biscuits wander in one direction or the other, transversely of the conveyor 2, one or other of the feelers 11a, 12a is raised by one of the two rows of biscuits lying adjacent to the edges 19a, 19b of the band conveyor. This results in the closure of the switch associated with the raised feeler and connection of the motor 6a to one of the batteries 28, 29. This sets the electric motor 6a rotating in the direction required to move the support 3a in the same direction as that in which the rows of biscuits have wandered. After a certain transverse displacement of the feeler support 3a the raised feeler drops back on to the surface of the conveyor 2 to disconnect the electric motor 6a from the battery and bring the feeler support to rest once more.

In both of the above described detecting means we prefer to provide the intermediate portion 14 of each feeler with inclined end portions (such as the portions 34 shown in Figure 2) to reduce the risk of damaging the biscuits as they pass under the feelers. If it is found that there is any tendency for the biscuits to be moved relative to the band conveyor by the feelers, the biscuits may be pressed lightly on to the conveyor band by means of springs or brushes arranged on the feeler support.

Figure 6:
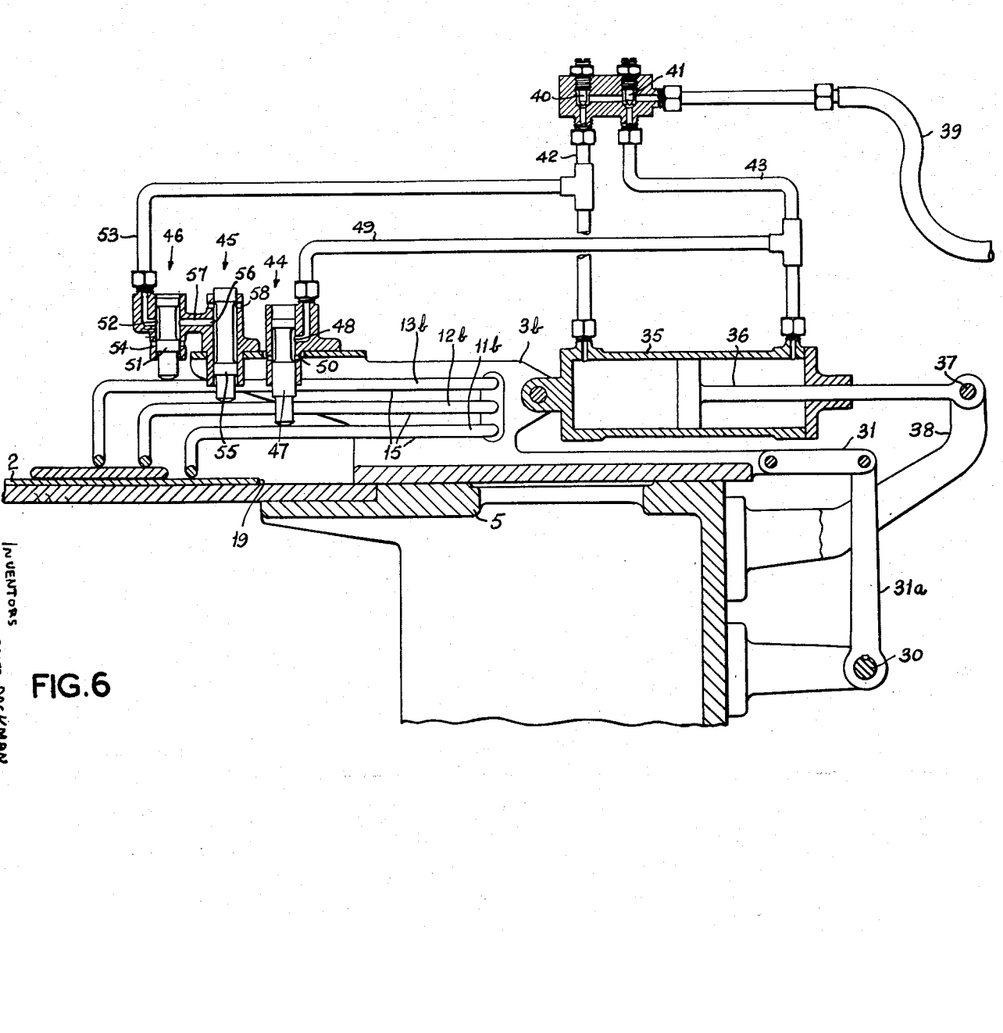
Figure 6 is a sectional end view of a third form of detecting means.

Figure 6 shows a third form of detecting means which is similar to that of Figures 1 to 3 in that it comprises three feelers 11b, 12b and 13b which are pivotally mounted on a feeler support 3b which can slide on the bedplate 5 transversely of the direction of advance of the conveyor 2. A double acting pneumatic cylinder 35 is pivotally connected to the feeler support 3b with the cylinder axis arranged transversely of the conveyor 2. The piston rod 36 of the cylinder 35 is pivoted at 37 to a bracket 38 secured to the framework of the conveyor 2. The cylinder 35 is supplied with compressed air from a circuit including a main supply pipe 39, needle valves 40 and 41 and branch supply pipes 42, 43.

Three air pressure balanced piston valves 44, 45 and 46 are mounted on the feeler support 3b and are associated with the end portions 15 of the feelers 11b, 12b and 13b, respectively. The valve 44 comprises a piston 47, a port 48 connected by a pipe 49 to the branch pipe 43, and a port 50 open to the atmosphere. The valve 46 comprises a piston 51, a port 52 connected by a pipe 53 to the branch pipe 42, and a port 54 open to the atmosphere. The valve 45 comprises a piston 55, a port 56 communicating with the valve 46 via a channel 57, and a port 58 open to the atmosphere. The pistons 47, 55 and 51 are adapted to be displaced vertically by pivotal movement of the feelers 11b, 12b and 13b, respectively, caused by the raising of the intermediate portions 14 of the feelers by the row 1 of biscuits.

The detecting means is shown in the position of equilibrium relative to the row 1. In this position the branch pipe 43 is connected to atmosphere via pipe 49 and ports 48 and 50, and the branch pipe 42 is connected to atmosphere via pipe 53, port 52, channel 57, port 56 and port 58. Both sides of the piston in the air cylinder 35 are therefore at atmospheric pressure and no displacement of the piston can take place.

If the row 1 moves towards the edge 19 of the conveyor 2 and raises the intermediate portion 14 of feeler 11b, piston 47 is raised and port 50 of valve 44 is closed. Air pressure then builds up in the right hand end of cylinder 35 and displaces the cylinder to the right. This causes the feeler support 3b to move to the right until feeler 11b drops off the biscuits of row 1 back on to the conveyor 2 to allow piston 47 to descend and re-open port 50. The air pressure in the right hand end of cylinder 35 is then rapidly relieved via pipe 49 and ports 48 and 50 to bring the cylinder 35 and the feeler support 3b to rest.

If the row 1 moves away from the edge 19 the intermediate portion 14 of the feeler 12b drops off the biscuits of row 1 on to the conveyor 2 so allowing the piston 55 to descend to close the port 58 of valve 45. Air pressure then builds up in the left hand end of cylinder 35 and the feeler support 3b is moved to the left until the intermedaite portion 14 of feeler 12b is again raised by the biscuits of row 1. This causes piston 55 to be raised once more to bring the cylinder 35 and feeler support 3b to rest.

If there is an interruption in the flow of the bicuits the intermediate portions 14 of both feelers 12b and 13b drop on to the conveyor 2. Although the dropping of feeler 12b causes closing of the port 58 of valve 45, the dropping of feeler 13b allows piston 51 to descend to open port 54. The pipe 53 is therefore still connected to atmosphere and no transverse movement of the feeler support 3b takes place.

As in the case of the previously described detecting means, the transverse movements of the feeler support art converted into rotary movements of the shaft 30 by means of the mechanical linkage 31, 31a.

Figure 7:
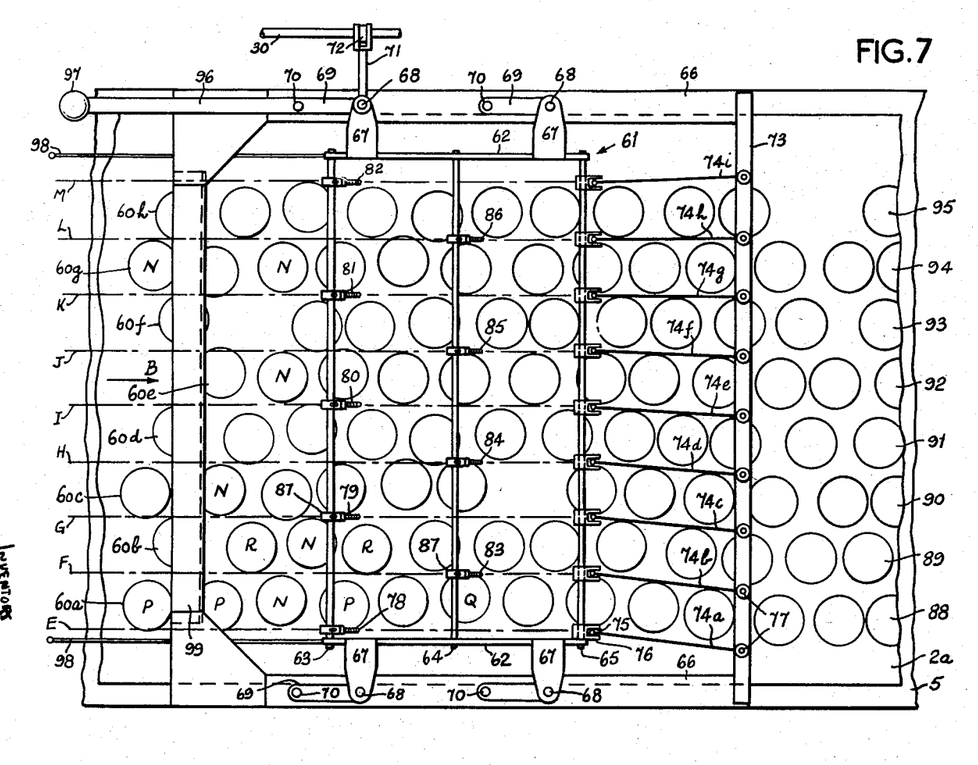
Figure 7 is a plan of one form of guide means forming part of apparatus according to the invention.
Figure 8:
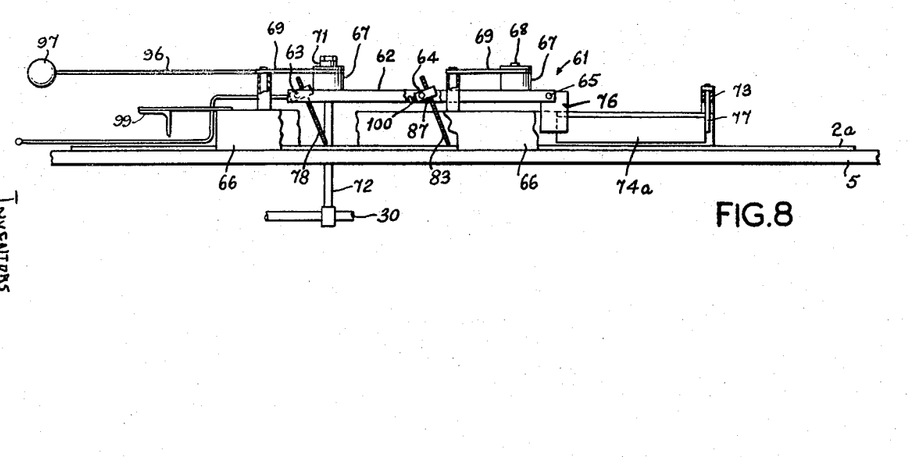
Figure 8 is a side view corresponding to Figure 7.

Figures 7 and 8 show a form of guide means for use wtih any of the detecting means described above.

This guide means is particularly suitable for handling rows of biscuits arranged on a band conveyor in the general direction of advance of the conveyor, which rows are not perfectly straight. The particular form of guide means shown in Figures 7 and 8 is intetnded for straightening and displacing transversely eight rows 60a–60h of biscuits of circular shape on a band conveyor 2a. The guide means comprises a frame, generally designated 61, consisting of two side members 62 connected together rigidly by three cross-members 63, 64, 65. This frame, which is of rectangular shape, is arranged above the conveyor 2a with the side members 62 adjacent to, and substantially parallel with, the edges of the conveyor. The three cross-members 63, 64, 65, which may be steel rods, lie in spaced parallel relationship above the upper surface of the conveyor 2a and in the transverse direction with respect to the direction of advance of the conveyor. As the biscuits are carried along by the conveyor in the direction of the arrow B they first pass under the cross-member 63, then under the cross-member 64 and finally under cross-member 65.

The frame of the guide means is mounted on supports 66 secured to the bedplate 5 of the conveyor so that it can undergo limited movement transversely with respect to the direction of advance of the conveyor in a plane lying parallel to the surface of the conveyor. To this end four brackets 67 secured to the side members 62 are connected by vertical pivots 68 to links 69 and these links are mounted at the upper ends of four vertical pivots 70 which are mounted at their lower ends on the supports 66. The four pivots 68 lie at the corners of a rectangle and the four pivots 70 lie at the corners of another rectangle of the same dimensions as the former. A control rod 71 is connected to one of the pivots 68 for the purpose of moving the frame 61 transversely with respect to the direction of advance of the conveyor. The control rod 71 is connected by a link 72 to the shaft 30 of the detecting means so that the rotary movements of the shaft 30 are converted into transverse movements of the frame 61. The shaft 30 is suitably journalled in bearings (not shown) secured to the framework of the conveyor 2a.

A fourth cross-member 73 arranged parallel with the three frame cross-member 63–65 is rigidly secured to the supports 66. The cross-member 73 which extends across the conveyor above the surface of the latter, is spaced from the cross-member 65 in the direction of advance of the conveyor. Nine substantially vertical rectangular guide plates 74a, 74b . . . 74i arranged substantially parallel to the direction of advance of the conveyor extend from the cross-member 65 to the cross-member 73. These guide plates are spaced apart, transversely with respect to the direction of advance of the conveyor, by an amount slightly greater than the diameter of the biscuits on the conveyor. At their upstream end the guide plates 74 are pivotally connected to the cross-member 65 and at their downstream end they are pivotally connected to the cross-member 73. Consequently, when the frame 61 is moved transversely with respect to the direction of advance of the conveyor the upstream end of each guide plate is displaced with the frame whereas the downstream end of each guide plate connected to the cross-member 73 merely pivots relative to the latter without being displaced transversely. Since the frame 61 undergoes a small displacement in the direction of advance of the conveyor simultaneously with its displacement transversely of that direction the guide plates 74 are connected to the cross-member 65 by means of suitable lost-motion connections. In the example illustrated the upstream end of each guide plate 74 is received in a vertical slot 75 in a support 76 secured to the cross-member 65. The pivots 77 connecting the guide plates 74 to the cross-member 73 support the guide plates with their lower edges immediately above the upper surface of the conveyor 2a.

Nine flexible metallic fingers 78–86, each comprising a length of close-coiled helical spring of the kind commonly used for supporting curtains, are supported at their upper ends in blocks 87 mounted on the cross-members 63, 64, the fingers 78–82 being supported on the cross-member 63 and the fingers 83–86 being suported on the cross member 64. These fingers project downwardly from the cross-members and have their lower ends resting on the surface of the conveyor 2a. These lower ends of the fingers may be provided with a smooth eyelet or button (not shown) to prevent the fingers from damaging the conveyor band or the biscuits lying thereon. The length of each of the fingers 78–86 from its supporting cross-member to the point at which it rests on the conveyor 2a is a little greater than the distance between the cross-member and the upper surface of the conveyor. As a result the lower free end of each finger rests on the conveyor 2a at a point which is a short distance downstream of the supported upper end of the finger in the direction of advance of the conveyor.

The upper ends of the fingers 78–86 are spaced apart on their cross-members so that the lower ends of the fingers supported by each cross-member are spaced apart, in the transverse direction with respect to the direction of advance of the conveyor 2a, by an amount equal to slightly more than twice the diameter of the biscuits on the conveyor. The transverse spacing between the lower ends of the fingers 78 and 83 is therefore slightly greater than the diameter of the biscuits. In like manner the transverse spacing between fingers 83 and 79, between fingers 79 and 84, between fingers 84 and 80, between fingers 80 and 85, between fingers 85 and 81, between fingers 81 and 86 and between fingers 86 and 82 is also slightly greater than the diameter of the biscuits. The spacing between the cross-members 63 and 64 in the direction of advance of the conveyor 2a, and hence the spacing in this direction between the lower ends of fingers 78–82 on the one hand and the lower ends of fingers 83–86 on the other hand, should not be less than the diameter of a biscuit. Preferably it is from one to three times the diameter of a biscuit.

In Figure 7 a number of chain lines E–M have been shown which lie parallel to the direction of advance of the conveyor 2a and each of which passes through the centre of the lower end of one of the fingers 78–86. Clearly, those biscuits which lie upstream of the lower ends of the fingers 78–82 and which are disposed substantially centrally between any two adjacent ones of the lines E–M will not come into contact with any of the fingers 78–86 in their passage under the frame 61. Such biscuits have been designated with the letter N in Figure 7. On the other hand, those biscuits which lie close to, or intersect, any of the lines E–M will be deflected transversely by one of the fingers 78–86. Thus the biscuits designated P will be deflected by the finger 78 towards the line F, the biscuit designated Q will be deflected by the finger 83 towards the line E, the biscuits designated R will be deflected by the finger 83 towards the line G, and so on. By the time a biscuit has moved past the lower ends of fingers 83–86 it will be disposed substantially centrally between two adjacent ones of the lines E–M and will be in a position to enter between two adjacent ones of the guide plates 74a–74i. Finally, when the biscuits pass under the cross-member 73 they are disposed in eight perfectly straight rows 88–95 lying parallel to the direction of advance of the conveyor 2a.

If, over a period of time, the biscuits approaching the frame 61 have a tendency to be displaced bodily towards one side or the other of the conveyor 2a, this movement is detected by the detecting means lying upstream of the frame 61 and shaft 30 rotates to move the control rod 71 in such a direction that the frame 61 is automatically displaced transversely into alignment with the displaced position of the biscuit rows. The upstream ends of the guide plates 74 which are connected to the third cross-member 65 take part in these movements of the frame 61 with the result that the biscuits can still enter between pairs of adjacent guide plates. The guide plates 74 then displace the biscuits transversely with respect to the direction of advance of the conveyor in the direction opposite to the bodily displacement of the biscuits prior to their arrival at the frame 61. Since the cross-member 73 is rigidly secured to the supporting framework of the conveyor 2a, the rows of biscuits leaving the guide means have a constant position in the transverse direction relative to the framework of the conveyor 2a irrespective of the position of the rows 60 on arrival at the guide means.

Thus it will be seen that the flowing biscuit rows are controlled by two correcting means. First, minor displacements of biscuits in any row are corrected by the fingers 78–86, and secondly, displacements transversely of the whole set of rows are corrected by means of the detecting means working in conjunction with the displacement of the whole frame 61 carrying the fingers.

In the event of breakdown of the detecting means the frame 61 may be operated manually. To this end one of the links 69 has an extension 96 provided at its free end with a handle 97. To assist the operator to adjust the frame 61 correctly in the transverse direction feelers 98 are secured to the frame and extend therefrom in the direction opposite to the direction of advance of the conveyor 2a. The operator then actuates the handle 97 so that the rows 60 of biscuits enter between the free ends of the two feelers 98.

At the upstream end of the guide means an angle 99 is arranged across the conveyor 2a and close to the upper surface thereof for the purpose of preventing biscuits passing under the frame 61 on top of one another.

In the above described guide means the number and spacing apart of the fingers on the cross members 63, 64 and the number and spacing apart of the guide plates 74 may be varied to suit the number of rows of biscuits being handled and the diameter of the biscuits. To this end the blocks 87 and the brackets 76 may be slidably mounted on their respective cross-members and the pivots 77 may be mounted in transverse slots (not shown) in the cross-member 73. When correctly adjusted, the blocks 87, brackets 76 and pivots 77 are suitably locked to their associated cross-members. For example, the blocks 87 may be clamped to the cross-members 63, 64 by screws 100 (see Figure 8).

The guide means of Figures 7 and 8 is not, of course, limited to the particular embodiment illustrated. Thus the fingers 78–86 may be arranged on more than two cross-members spaced apart in the direction of advance of the conveyor. Again the fingers need not be made from the material mentioned above but may be made from any suitable flexible material, or they can be made from rigid material if desired. The fingers may have a rectangular cross-section so that their flexibility is greater in one direction than in the direction normal to that direction.

In a modified form of the guide means of Figures 7 and 8 the fingers 78–86 and the cross-member 64 are omitted so that the rows of biscuits pass directly to the guide plates 74. The frame 61, comprising the cross-members 63 and 65, is again linked to the detecting means so that the upstream ends of the guide plates 74 are at all times correctly adjusted in the transverse direction to receive the rows 60 of biscuits. After leaving the guide plates 74 the biscuits may pass between stationary curved deflector plates which, in the case of non-circular biscuits, orientate all the biscuits in substantially the same direction. For example, in the case of square biscuits the deflector plates may be arranged to orientate the biscuits so that they all lie on the band conveyor with one edge lying parallel to the edges of the conveyor. The deflector plates are all similarly curved so that a point on each plate at or adjacent to its downstream end is displaced transversely with respect to a point on the plate at or adjacent to its upstream end. The extent of this displacement is such that each biscuit as it passes between adjacent deflector plates will always touch the deflector plate that curves in front of its path of travel and will be repositioned and re-orientated on the conveyor by this plate.

Figure 9:
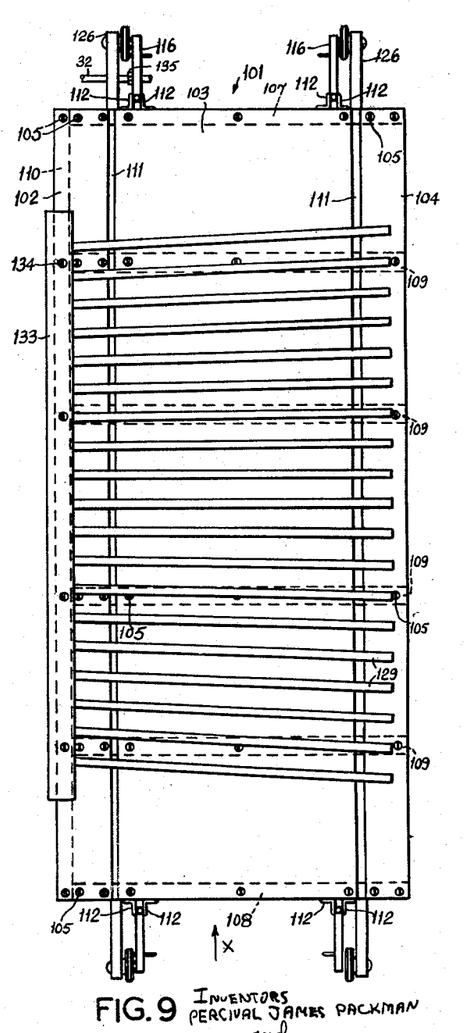
Figure 9 is a plan of a second form of guide means forming part of apparatus according to the invention.
Figure 10:
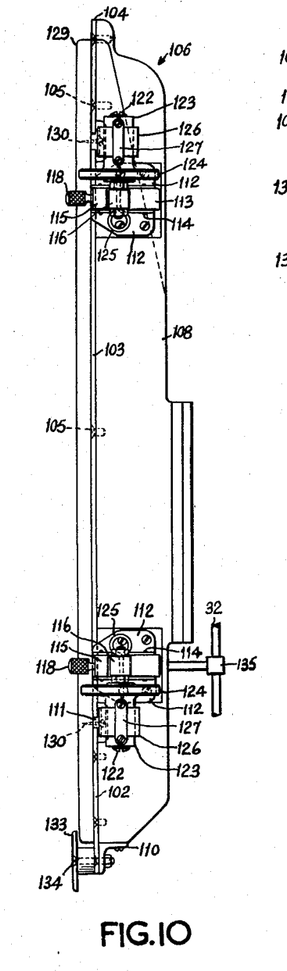
Figure 10 is a view in the direction of the arrow X in Figure 9, on an enlarged scale.
Figures 11, 12:
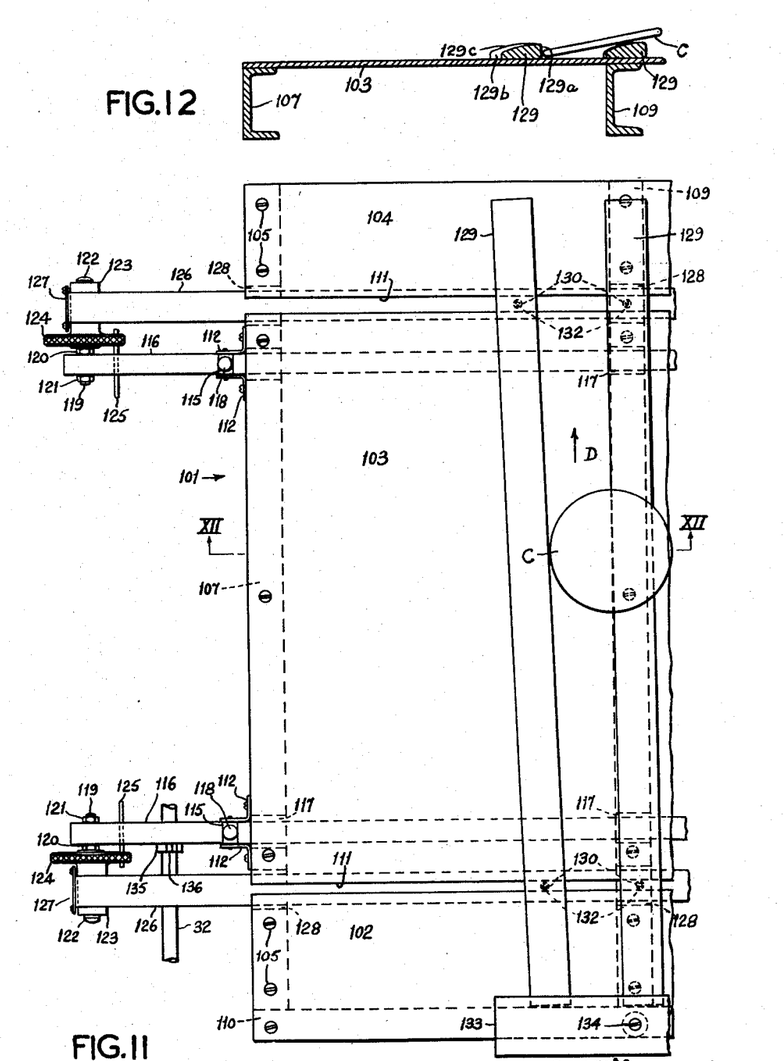
Figure 11 shows a part of Figure 9 on an enlarged scale.
Figure 12 is a section along the line XII—XII of Figure 11 of the supporting surface, frame members and guiding members of the apparatus.

Figures 9 to 12 show a further form of guide means which may be combined with any of the detecting means described above. This guide means is intended particularly for the handling of up to eighteen rows of flat articles, such as biscuits. The stationary supporting surface 101 of the guide means is rectangular and is formed by three substantially plane thin rectangular sheets 102, 103 and 104 made of any suitable material, such as wood, hardboard, synthetic resin or metal. These sheets are secured by screws 105 to a frame, generally designated 106, which is formed by two side channels 107, 108, four intermediate channels 109 and an angle 110. The sheets 102, 103 and 104 are secured to the frame 106 in spaced parallel relationship with their upper surfaces in substantially the same plane and with narrow gaps 111 between adjacent sheets. On the outwardly directed surface of each of the side channels 107 and 108 are mounted two pairs of brackets 112, these brackets being arranged near to the gaps 111. Each pair of brackets 112 supports a roller 113 which is rotatably mounted between the bracket on a shaft 114 secured to the brackets near their lower ends. A distance piece 115 is secured between each pair of brackets 112 near their upper ends. Two bars 116 of square section are supported under the sheet 103 parallel to the gaps 111 by means of the brackets 112, each bar 116 being associated with a pair of brackets 112 mounted on the channel 107 and another pair of brackets 112 mounted on the channel 108. These bars 116, which may be of wood or metal, extend a short distance beyond the side channels 107, 108 and are received in the brackets 112 between the rollers 113 and the distance pieces 115. Suitable recesses 117 are provided in the channels 107, 108 and 109 for the passage of the bars 116. The bars 116 can slide in the brackets 112 on the rollers 113 in a direction parallel to the axes of the gaps 111. Each bar 116 is bored adjacent to each of its ends for the reception of bolts 119 which are secured to the bar by means of nuts 120 and 121. On each of the bolts 119 a sleeve 123 is rotatably mounted between the nut 120 and the bolt head 122. Each sleeve 123 is provided with a circular flange 124 to facilitate manual rotation of the sleeve on its bolt 119. The peripheral edge of each flange 124 may be knurled (as indicated in Figure 11 only). Each sleeve 123 may be locked against rotation on its bolt 119 by means of a removable pin 125 which passes through a suitable hole in the bar 116 and enters one of a series of holes drilled through the flange 124 near its peripheral edge. Two elastic strips 126, for example strips of rubber having a width of ¾" and a thickness of 1/16", pass under the supporting surface 101 parallel to and immediately below the gaps 111, the ends of the elastic strips being clamped by plates 127 to the sleeve 123 which are arranged to be in alignment with the gaps 111. Suitable recesses 128 are formed in the channels 107, 108 and 109 for the passage of the strips 126.

From the description so far it will be appreciated that rotation of one of the sleeves 123, or simultaneous rotation of the two sleeves 123 associated with one strip 126 in opposite directions, or simultaneous rotation of the two sleeves 123 associated with one strip 126 in the same direction but by different amounts, will cause either an increase or decrease in length of the strip 126 associated with the rotated sleeve or sleeves. On the other hand, if both sleeves 123 associated with one elastic strip 126 are rotated the same amount in the same direction the strip will be moved in the direction of the axis of the gap 111 without any change in its length. Movement of the elastic strips 126 in this way may also be effected by moving the bars 116 relative to the brackets 112 in the direction of the axes of the gaps 111.

Nineteen substantially straight thin guides 129, preferably made of wood, rest on the upper surface of the sheets 102, 103 and 104. These guides have a plane lower surface, vertical sides 129a, 129b and a slightly convex upper surface 129c. The side 129a is higher than the side 129b so that the guides have a tapered cross-section, as shown in Figure 12. Each guide 129 lies substantially at right angles to the gaps 111 and extends from a point near to the angle 110 to a point near to the edge of the supporting surface 101 remote from the angle 110, passing over both of the gaps 111. The guides 129 are connected to both of the elastic strips 126 by means of screws 130 passing upwardly through the elastic strips 126 and the gaps 111 into the guides. To this end nineteen holes 132 are punched in each of the elastic strips 126 for the passage of the screws 130, these holes 132 being spaced apart equidistantly in the two strips when both strips are in the unstretched state. The screws 130 are not tightened on to the elastic strips 126 with the result that the guides 129 are able to pivot relative to the elastic strip.

By rotating the sleeves 123 the pitch distance of the holes 132 in each elastic strip 126 can be varied, but in each strip the holes 132 will still be spaced apart substantially equidistantly. The pitch distance of the holes 132 can of course be varied in the two strips independently of one another. It will be apreciated, therefore, that by rotating the sleeve 123 it is possible to effect a rapid and simultaneous adjustment of the spacing apart of all the guiding strips 129, either at one end or at both ends of the latter. Apart from separating or closing together the guides 129, it is of course possible to adjust them in other ways. For example one or both ends of the guides 129 may be displaced bodily in the direction of the axis of the gap 111 with or without alteration of the spacing apart of the guides. Again, the guides 129 may be made to converge or diverge from one end of the supporting surface 101 to the other.

The apparatus shown in Figures 9 to 12 is intended to be employed for guiding rows of biscuits from the discharge end of a first band conveyor on to a second band conveyor arranged at a lower level than the first. The stationary surface 101 is arranged to bridge the gap between the two conveyors, with the sheet 102 adjacent to the discharge end of the first conveyor and the sheet 104 adjacent to the surface of the second conveyor, the surface 101 sloping downwardly in the direction from the sheet 102 to the sheet 104.

The spacing apart of the guides is adjusted by means of the sleeves 123 to suit the dimensions of the biscuits being handled and the sleeves 123 are then locked against rotation by means of the pins 125. The spacing apart of the guides 129 must not exceed the minimum transverse dimension of the biscuits being handled. A biscuit, such as that indicated at C in Figures 11 and 12, which passes from the first conveyor on to the guide means will then rest at one edge on the support 101 and on the surface 129c of one guide 129. In other words the biscuit is tilted transversely of its direction of advance down the supporting surface 101, indicated by the arrow D. As a result the biscuit is urged transversely by gravity against the vertical side 129a of the adjacent guide 129. The rounded upper surface 129c of the guides 129 facilitates this transverse movement of the biscuits.

The shaft 30 of the detecting means, which is arranged upstream of the discharge end of the first conveyor, is connected to the bar 116 at the upstream end of the surface 101 by means of a lever 135 secured to the shaft engaging a pin 136 in the bar 116 so that the rotary movements of the shaft 30 are converted into transverse movements of the bar 116.

If, over a period of time, the biscuits passing the detecting means have a tendency to move bodily in the transverse direction relative to the frame of the first conveyor, this movement is transmitted to the bar 116 at the upstream end of the guide means by the shaft 30. Consequently, the guides 129 are automatically adjusted in the transverse direction so that they are in the correct position to receive biscuits discharged onto the guide means from the first conveyor.

Screws 118 are provided in the distance pieces 115 for the purpose of clamping the bars 116 relative to the supporting surface 101. Clamping in this way of the bar 116 lying adjacent to the upstream end of the guide means facilitates the setting up and initial adjustment of the combined guide means and detecting means. Once this setting up is completed the screws 118 associated with this bar 116 are unlocked. The screws 118 associated with the other bar 116 enable the downstream ends of the guides 129 to be locked in any position relative to the frame of the second conveyor.

A strip 133 preferably is arranged along the edge of the supporting surface 101 at which the biscuits enter the guide means. This strip is arranged at such a height above the supporting surface 101 that it prevents biscuits passing into the guide means on top of one another. The strip 133 is secured to the angle 110 by means of screws 134.

Preferably the various detecting means and guide means described above are supported from the framework of the conveyor so that they may be moved vertically upwards from the conveyor surface. An automatic lifting mechanism may be provided for this purpose, actuation of this lifting mechanism being initiated by a pile up of biscuits at the feelers of the detecting means.

Although the invention has been described in detail above with reference to the handling of biscuits it will be appreciated that the apparatus may be employed to handle other articles.

What we claim is:

1. Apparatus for automatically repositioning articles lying on a moving conveying surface in a number of rows extending in the general direction of advance of the conveying surface comprising guide means adapted to deflect the rows of articles transversely with respect to the direction of advance of the conveying surface, if necessary, to bring the rows into a predetermined position relative to the supporting framework of said conveying surface, and further means arranged in advance of said guide means for detecting transverse displacement in excess of a predetermined amount of one or more rows of the articles relative to the supporting framework of the same or another conveying surface and for adjusting the position of said guide means to receive the rows of articles.

2. Apparatus as claimed in claim 1, in which said detecting means comprises a first feeler adapted to detect transverse movement of the rows of articles in one direction relative to the supporting framework of the conveying surface and a second feeler adapted to detect transverse movement of the rows of articles in the opposite direction.

3. Apparatus as claimed in claim 2, in which said feelers are mounted on a support adapted to move transversely with respect to the direction of advance of the conveying surface.

4. Apparatus as claimed in claim 3, comprising a reversible electric motor adapted to effect the transverse movements of the feeder support.

5. Apparatus as claimed in claim 4, comprising an electric switch controlled by each of said feelers, one of said switches controlling rotation of the electric motor in one direction to effect transverse movement of the feeler support in one direction and the other of said switches controlling rotation of the electric motor in the other direction to effect transverse movement of the feeler support in the opposite direction.

6. Apparatus as claimed in claim 5, comprising a third feeler mounted on said feeler support and controlling a third electric switch in the supply circuit of said motor, said third feeler serving to detect an interuption in the flow of articles on the conveying surface and to disconnect said motor from its supply circuit when such an interruption occurs.

7. Apparatus as claimed in claim 3, comprising a double acting pneumatic piston and cylinder assembly adapted to effect the transverse movements of the feeler support.

8. Apparatus as claimed in claim 7, comprising an air valve controlled by each of said feelers, one of said air valves controlling the supply of compressed air to one end of said piston and cylinder assembly to effect transverse movement of the feeler support in one direction and the other of said air valves controlling the supply of compressed air to the other end of said piston and cylinder assembly to effect transverse movement of the feeler support in the opposite direction.

9. Apparatus as claimed in claim 8, comprising a third feeler mounted on said feeler support and controlling a third air valve, said third feeler serving to detect an interruption in the flow of articles on the conveying surface and to actuate said third air valve to connect both ends of said piston and cylinder assembly to atmosphere when such an interrupiton occurs.

10. Apparatus as claimed in claim 3, including a shaft extending from the detecting means to the guide means, the rotary movements of said shaft causing transverse movements of the guids means and means for converting transverse movement of the feeler support into rotary movements of said shaft.

11. Apparatus for automatically positioning articles, comprising, in combination, conveyor means movable in one direction and having a surface for supporting articles arranged in a row in direction of movement of said surface; a support movable in opposite directions transverse to said one direction; first sensing means mounted on said support for movement to and from a position engaging said surface in an area adapted to be adjacent said articles so that said first sensing means cannot move to said position when articles move in one transverse direction into said area; second sensing means mounted on said support for movement to and from a position engaging said surface in an area normally occupied by the articles so that said second sensing means cannot move to said position thereof when the articles are correctly placed and moves to said position when the articles move in the opposite transverse direction; drive means for moving said support in said opposite transverse directions, respectively, said drive means being operatively connected to said first and second sensing means and controlled by the same to move said support in said one transverse direction when said first sensing means is moved out of said position thereof by articles moving in said one transverse direction, and to move said support in the opposite transverse direction when said second sensing means moves to said position thereof due to displacement of said articles in said opposite transverse direction; and transversely movable guiding means for the row of articles operatively connected to said support to be shifted corresponding to the position of the articles.

12. Apparatus for automatically positioning articles, comprising, in combination, conveyor means movable in one direction and having a surface for supporting articles arranged in a row in direction of movement of said surface; a support movable in opposite directions transverse to said one direction; first sensing means mounted on said support for movement to and from a position engaging said surface in an area adapted to be adjacent said articles so that said first sensing means cannot move to said position when articles move in one transverse direction into said area; second sensing means mounted on said support for movement to and from a position engaging said surface in an area normally occupied by the articles so that said second sensing means cannot move to said position thereof when the articles are correctly placed and moves to said position when the articles move in the opposite transverse direction; drive means for moving said support in said opposite transverse directions, respectively, said drive means being operatively connected to said first and second sensing means and controlled by the same to move said support in said one transverse direction when said first sensing means is moved out of said position thereof by articles moving in said one transverse direction, and to move said support in the opposite transverse direction when said second sensing means moves to said position thereof due to displacement of said articles in said opposite transverse direction; transversely movable guiding means for the row of articles operatively connected to said support to be shifted corresponding to the position of the articles; and third sensing means movable to and from a position engaging said surface in an area normally occupied by the central portions of the articles so that said third sensing means moves to said position thereof when no articles are located on said surface in the region of said third sensing means, said third sensing means being operatively connected to said drive means for rendering the same inoperative when said third sensing means moves to said position thereof.

13. Apparatus as set forth in claim 11 wherein said drive means is an electric motor; and comprising circuit means connected to said motor and including switches operated by the sensing means.

14. Apparatus as set forth in claim 11 wherein said drive means is fluid-operated, and comprising conduit means connected to said fluid-operated drive means, and valve means in said conduit means and operated by said sensing means.

15. Apparatus as set forth in claim 11 wherein each of said sensing means includes an elongated portion extending in said one direction, said elongated portions of said sensing means extending parallel to each other, each portion being adapted to engage a plurality of said articles.

References Cited in the file of this patent

UNITED STATES PATENTS

| | | |
|---|---|---|
| 791,243 | Carlson | May 30, 1905 |
| 2,205,106 | Paterson | June 18, 1940 |
| 2,596,228 | Fletcher | May 13, 1952 |